May 1, 1928.

F. DORMANN 1,668,494

PARKING AND STORAGE GARAGE

Filed Feb. 4, 1927      2 Sheets-Sheet 1

Witness
John B. Dade.

Inventor
Fred Dormann
by Wilkinson & Ginsta
his Attorneys.

May 1, 1928.                                          1,668,494
F. DORMANN
PARKING AND STORAGE GARAGE
Filed Feb. 4, 1927                     2 Sheets-Sheet 2
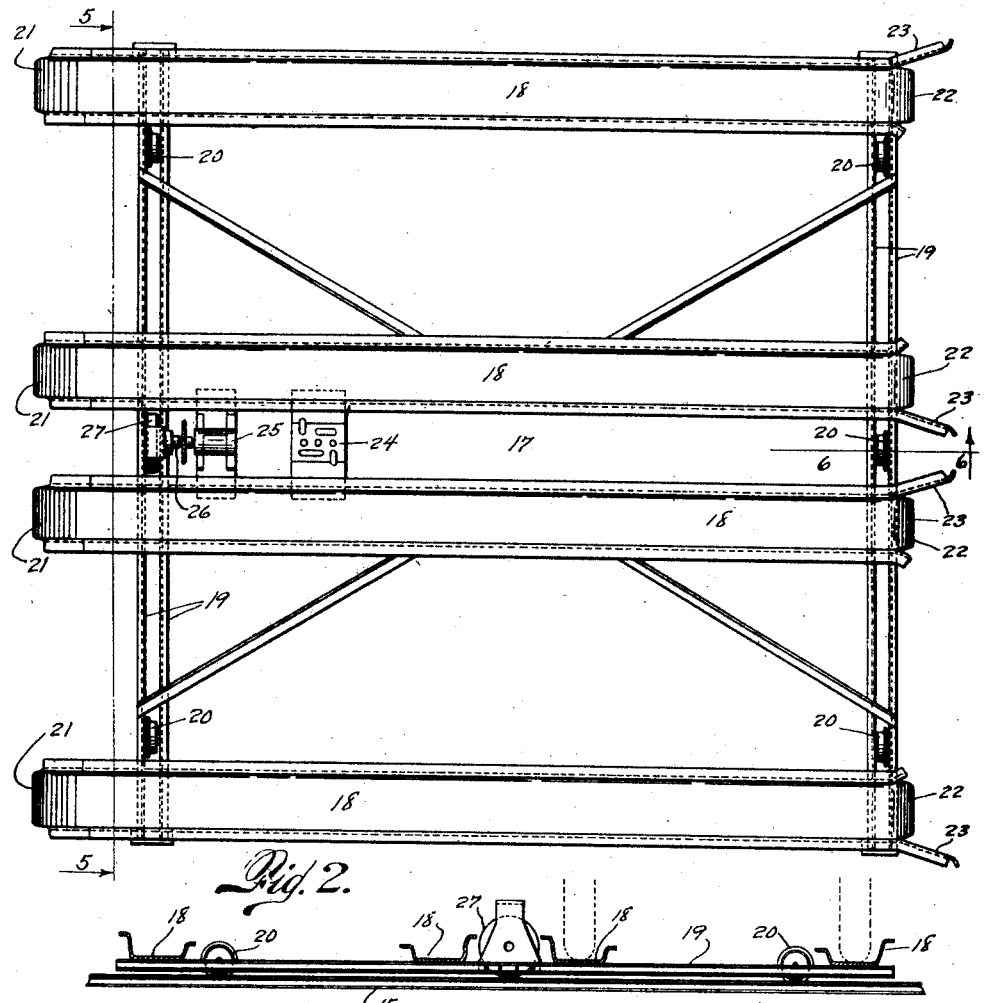
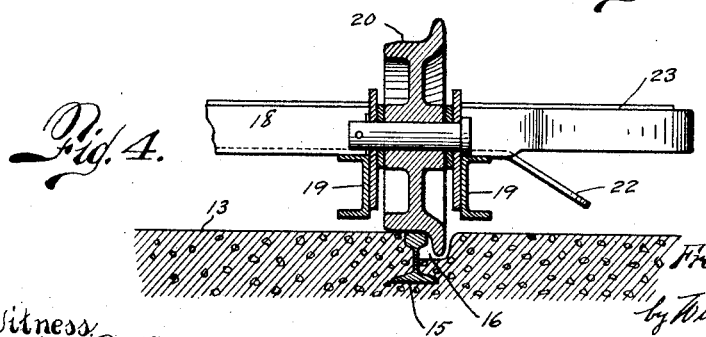

Patented May 1, 1928.

1,668,494

UNITED STATES PATENT OFFICE.

FRED DORMANN, OF DENVER, COLORADO, ASSIGNOR TO SHANKLAND, RISTINE & CO., OF DENVER, COLORADO, A CORPORATION OF COLORADO.

PARKING AND STORAGE GARAGE.

Application filed February 4, 1927. Serial No. 165,897.

This invention relates to improvements in parking and storage garages, and while from its broader aspect the invention comprehends the layout and equipment of a single floor arrangement, as well as for plural floor arrangements, still the improvements have been more especially devised with reference to multiple story garages, and the urgent need of which structures is well understood.

At the outset it may be stated that wherever herein I use the expression "far-end", or its equivalent, as to ground floor layouts, which may be embodied in a single story structure and accordingly without an elevator, the term is intended to indicate that end which is opposite to the vehicle entrance; but with reference to floors above the ground floor, in multiple story garages, the expression is employed in the sense of that end of the floor space which is oppositely distant from the elevator in the longitudinal direction thereof, or at the other end of the floor space therefrom. Also, while the elevator shaft has been shown at what I have designated as the rear end of the building, which would probably be its most practical location, still it could be located at the entrance end of the building, and which would ordinarily be considered the front thereof.

It has been the usual custom in garages to simply run the automotive vehicle on its own power along the main floor space to a position substantially beyond the position it is to finally occupy, and then to properly back the vehicle until it is positioned, within its storage or parking zone, at right angles to and rearwardly abutting a side wall of the structure, in order to utilize all available storage space and also that the vehicle be positioned to afford ready egress when desired, although in other instances the vehicles may be distributed at other but more undesirable angles. Provision must be made, however, for the storage of cars, trucks and other types of the vehicles of widely varying lengths, and in all such circumstances, therefore, the longer vehicles necessarily project into the main floor space substantially beyond the shorter vehicles. Not only does such laterally extended parking of the longer vehicles occasion the loss of much otherwise available space, thus requiring structures of relatively wider dimensions to provide sufficient clearance to manipulate the vehicles, because the spaces between the outer ends of the longer and shorter machines are in fact dead areas, but it also follows that it becomes very difficult to properly park the long vehicles anywhere along the line, owing to the limited aisle-like space for their manipulation, and in truth it also becomes somewhat difficult to even park the shorter vehicles, owing to the obstructions offered by the projected longer vehicles. Perhaps more important still, under any and all such instances, it is almost wholly impracticable to facilely manipulate the parking of vehicles into the end storing zones, particularly at the far end of the floor and especially if they be the long vehicles, because in order to back the vehicle properly into its storage space (unless indeed it is undesirably backed into the garage in the first instance) it is necessary to first run the vehicle to a position in advance of its parking space, as before explained, and of course this is not feasible, at this far end of the floor, owing to the obstruction offered by the far wall of the structure. At all events, material time is wasted, much annoyance is involved, and not infrequently substantial damage is done to vehicles by inevitable collisions or bumping together of the cars under these old methods of parking and storing.

The object of my invention is to provide a garage structure with floor space so arranged that a comparatively large number of vehicles may be stored therein, and these vehicles may be quickly and conveniently transferred from place to place or taken out of storage or put back in storage when desired.

Reference is had to the accompanying drawings in which like parts are indicated by similar reference symbols throughout the several views, and in which Figure 1 is a plan view of one floor of a garage structure as laid out according to my invention.

Figure 2 is a plan view of a pair of storage platforms as shown in Figure 1, the parts being shown on a larger scale than in said figure.

Figure 3 shows a vertical section along the line 5—5 of Figure 2, and looking in the direction of the arrows.

Figure 4 is a sectional view along the line

Figure 1:
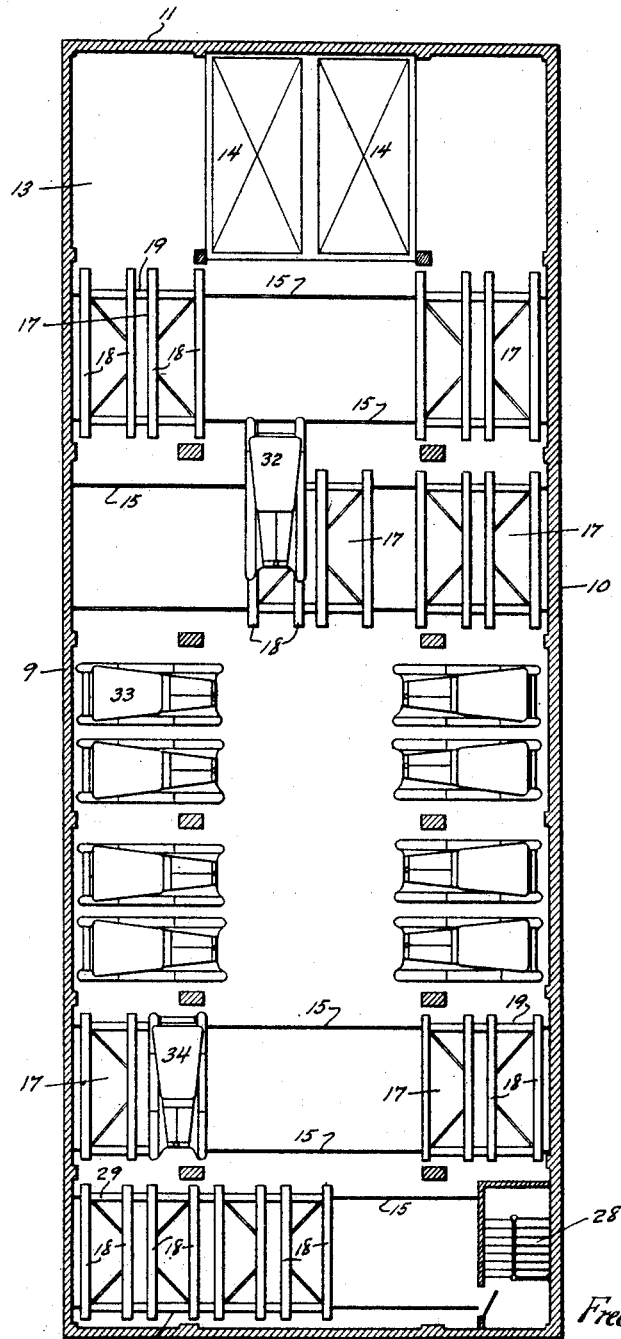

4—4 of Figure 5, and looking in the direction of the arrows, the parts being shown on a larger scale than in said figure.

The numerals 9 and 10 indicate the side walls and 12 and 11 the front and rear walls, respectively, of a garage building, and when a multiple story building, which obviously would be the preferred structure, the floors 13 thereof are made accessible for the storage of vehicles by means of the usual elevator shaft having one or more elevators therein, as indicated at 14.

Disposed at suitable positions along the floor space are a series of transversely extending tracks, preferably in the nature of paired T-rails 15, or their equivalent, the tread surfaces of which may be approximately flush with the floor, with the floor having a depression 16 extending along one side of each rail, as seen at Figure 4, but these latter features are obviously variable details, and any other suitable form of transversely extending trackway means could be employed.

Operating in a sidewise manner, transversely of the floor along said tracks, are mounted storage platforms 17 which are hereinafter more particularly described. These platforms are preferably of framework structure, and embody one or more pairs of complementary guideways 18, providing runways for the vehicle wheels, the said guideways being disposed longitudinally of each platform, or parallel with the side walls of the building. These guideways 18 are preferably formed of pressed steel or channel iron or their equivalent, and their channels may be sufficiently wide for average usages.

A suitable construction for these sidewise actuated platforms is shown more in detail at Figures 1, 2 and 3, wherein the channeled guideway elements 18 are supported at each end by a pair of opposedly spaced cross sills 19, which may also be of channel formation, and between which are suitably journaled, as at Figure 4, a plurality of flanged wheels 20 for idle travel along said transversely disposed track rails 15. The cross webs of the guideway members 18 may be upturned at their rear ends, as at 21, to provide bumper or limiting stops to the travel of the vehicle when run thereon, while the forward ends thereof may be projected at a downward angle, as at 22, to provide ramp ends or inclined planes for more facilely running the vehicles upon the guideway elements, and the outer side webs at their forward ends may be provided with a divergent tongue or end 23, associated with its adjacent downturned lip 22, for laterally guiding the vehicle up to the short inclines.

As a matter of fact, these transversely operating platforms or trucks 17 may be actuated in any suitable way, whether manually, mechanically or electrically, but a very practical way is to install them with a storage battery 24, supplying current to a small reversible electric motor 25, which latter is coupled up, through interposed gearing 26, with a driven wheel 27 that may be journaled in an analogous manner to one of the flanged wheels 20, in substitution for a central one of the latter, the driven wheel 27 being adapted for tractional engagement with its complementary track rail 15. All of these elements are simply shown in more or less of a conventional manner, as being sufficiently obvious.

In the preferred arrangement, shown at Figure 1, the layout provides for the storage of the vehicles at each side of the building, with some of the vehicles heading longitudinally of the floor space and others heading transversely thereof, for reasons hereinafter appearing, and with a substantial number of them heading longitudinally of the floor space along the front or far-end of the building, this arrangement also providing for a desirable stairway 28 at a front corner of the building.

In this arrangement, the extreme front or far-end platform unit is of substantially elongated form, to provide for the mounting of a greater number of the paired guideway members 18 than are carried by the individual ones of the other platform units, and the longer cross sills thereof are designated by the numeral 29 in distinguishing them over the shorter cross sills 19 of the other platform units.

In the employment of this elongated platform unit sufficient space must be left to enable the left end portion thereof to be brought in line with the aisle space when the unit is moved to the right in proximity to the stairway wall, but if the stairway be omitted at this end of the structure, then a still further pair of the guideway members 18 could be carried by this far-end platform unit, or there might be two such far-end platform units with two pairs of guideway members on the one and three on the other, when considering a building of the width proportionately illustrated, at Figure 1, as being about fifty feet wide. This preferred arrangement, for a structure of the approximate width stated, discloses two pairs of the guideway elements 18 on each of the platform units rearwardly of the extreme far-end longer unit, and it also shows a pair of the endwise vehicle receiving and discharging elevators 14, for speedier capacity handling.

The essential feature is that an unobstructed aisle space limited by width and not length of cars may be maintained when all of these platform units are in their retracted or storage positions, and that sufficient lateral clearance is provided for, by the aisle space, to permit the far side or any portion of each of said units, as selected, to be brought into such proper position, within the otherwise unobstructed aisle space, as to receive quickly thereon and discharge quickly therefrom the vehicles as propelled in a direction longitudinally of the aisle space.

It will be observed, however, that in the arrangement of Figure 1 provision has also been made for the storage of some of the vehicles in positions heading transversely of the floor, instead of longitudinally thereof, and that in this particular storage zone the floor is free of all track rails and the sidewise movable platform units. The removal operations would be substantially the reverse of the storage operation.

In Figure 1, one of the longer vehicles 32 is shown as being run onto a pair of the guideway members 18 of one of the platform units, now positioned in the aisle space, for bodily sidewise shifting into storage position, on its supporting platform unit, immediately rearward of the shorter vehicle 33, which latter is not supported upon a platform but directly on the floor, and is stored in transversely headed disposition. The numeral 34 indicates one of the shorter vehicles parked in sidewise relation upon one of the platforms, at a position forwardly of said vehicle 33, and illustrates that the platforms may be used for either the longer or the shorter vehicles, when and as desired.

I claim as my invention:

1. In garage structures, a floor layout embodying a plurality of trackways extending transversely across the floor, at appropriate storage zone positions located forwardly and rearwardly of said floor, with a substantial portion of said floor, intermediate of said forwardly and rearwardly located trackways, maintained clear of said trackways for the storage of wheeled vehicles directly supported on said floor and headed transversely along the sides thereof, and storage platforms so distributed at opposite sides of the floor and independently shiftable along the respective said trackways as to provide for an unobstructed central aisle between the platforms at opposite sides of the floor, said aisle serving as an uninterrupted runway for the vehicles, mounted on any of said movable platforms as selected from either side of the floor and temporarily moved into said aisle.

2. In garage structures, a floor layout embodying a plurality of trackways extending transeversely of the floor, at storage zone positions located forwardly and rearwardly of said floor, with a substantial portion of said floor intermediate of said forwardly and rearwardly located trackways, maintained clear of said trackways, for the storage of wheeled vehicles directly supported on said floor in transversely headed disposition of the sides thereof, and with the extreme far-end one of said trackways disposed along the extreme far-end zone of the floor, storage platforms distributed at opposite sides of the floor and independently shiftable along their said respective trackways to provide an unobstructed aisle between the platforms at opposite sides of the floor, and a similar elongated platform, of greater storage capacity than any of the others, operating along said extreme far-end trackway, the said aisle providing an uninterrupted runway for said vehicles, and extending into vehicle loading and unloading association with any portion of any of said platforms as selected and moved into the longitudinal zone of said aisle.

In testimony whereof, I affix my signature.

FRED DORMANN.